(12) United States Patent
Gaskins

(10) Patent No.: US 7,444,472 B2
(45) Date of Patent: *Oct. 28, 2008

(54) APPARATUS AND METHOD FOR WRITING A SPARSELY POPULATED CACHE LINE TO MEMORY

(75) Inventor: Darius D. Gaskins, Austin, TX (US)

(73) Assignee: Via Technologies, Inc., Taipei (TW)

( * ) Notice: Subject to any disclaimer, the term of this patent is extended or adjusted under 35 U.S.C. 154(b) by 61 days.

This patent is subject to a terminal disclaimer.

(21) Appl. No.: 11/364,704

(22) Filed: Feb. 28, 2006

(65) Prior Publication Data

US 2007/0028021 A1 Feb. 1, 2007

Related U.S. Application Data

(60) Provisional application No. 60/700,691, filed on Jul. 19, 2005.

(51) Int. Cl.
*G06F 12/00* (2006.01)
(52) U.S. Cl. ...................................... 711/118
(58) Field of Classification Search ................ 710/107, 710/306, 52, 5, 9; 711/133, 118, 154, 155, 711/3; 709/203, 227
See application file for complete search history.

(56) References Cited

U.S. PATENT DOCUMENTS

| | | | |
|---|---|---|---|
| 4,796,232 A | 1/1989 | House | |
| 5,255,378 A | 10/1993 | Crawford et al. | |
| 5,537,624 A | 7/1996 | Whitesell | |
| 5,561,780 A * | 10/1996 | Glew et al. | 711/126 |
| 5,640,517 A | 6/1997 | Parks et al. | |
| 5,644,788 A | 7/1997 | Courtright et al. | |
| 5,835,741 A * | 11/1998 | Elkhoury et al. | 710/310 |
| 5,901,298 A | 5/1999 | Cummins et al. | |

(Continued)

FOREIGN PATENT DOCUMENTS

EP        1242898        9/2002

(Continued)

OTHER PUBLICATIONS

"Microarchitecture and performance analysis of a SPARC-V9 microprocessor for enterprise server systems" by Sakamoto et al. (abstract only) Publication Date: Feb. 8-12, 2003.*

*Primary Examiner*—Paul R Myers
(74) *Attorney, Agent, or Firm*—Gary R. Stanford; Richard K. Huffman; James W. Huffman

(57) ABSTRACT

A microprocessor including processor logic and sparse write logic. The processor logic asserts address and request signals to provide an address and a request for a cache line memory write transaction. The sparse write logic causes the processor logic to modify a second part of the write request to specify the sparse write command value and to provide the corresponding enable bits. The sparse write-combined memory write transaction may be a quad-pumped cache line write transaction for writing eight quadwords in which each enable bit identifies a corresponding doubleword. A method of performing a sparse write-combined write transaction including providing an address and a request for a memory write transaction, indicating that the memory write transaction is a sparse write-combined write transaction, asserting enable signals for the sparse write-combined write transaction, and providing data for the sparse write-combined write transaction.

13 Claims, 4 Drawing Sheets

MICROPROCESSOR AND SIGNALS FOR SPARSE WRITE TRANSACTIONS

U.S. PATENT DOCUMENTS

| | | | |
|---|---|---|---|
| 5,915,126 A | 6/1999 | Maule et al. | |
| 5,919,254 A | 7/1999 | Pawlowski et al. | |
| 5,944,806 A | 8/1999 | Melvin et al. | |
| 5,960,453 A | 9/1999 | Pawlowski | |
| 6,012,116 A | 1/2000 | Aybay et al. | |
| 6,032,225 A | 2/2000 | Shiell et al. | |
| 6,311,245 B1 | 10/2001 | Klein | |
| 6,356,270 B2 * | 3/2002 | Pentkovski et al. | 345/530 |
| 6,405,280 B1 | 6/2002 | Ryan | |
| 6,405,285 B1 | 6/2002 | Arimilli et al. | |
| 6,434,654 B1 | 8/2002 | Story et al. | |
| 6,505,259 B1 | 1/2003 | Garcia et al. | |
| 6,523,109 B1 | 2/2003 | Meier | |
| 6,587,862 B1 | 7/2003 | Henderson | |
| 6,601,121 B2 | 7/2003 | Singh et al. | |
| 6,609,171 B1 | 8/2003 | Singh et al. | |
| 6,671,752 B1 * | 12/2003 | Rao et al. | 710/52 |
| 6,742,160 B2 | 5/2004 | Greiner | |
| 6,804,735 B2 | 10/2004 | Singh et al. | |
| 6,807,592 B2 | 10/2004 | Singh et al. | |
| 6,907,487 B2 | 6/2005 | Singh et al. | |
| 6,954,208 B2 * | 10/2005 | Doyle et al. | 345/537 |
| 7,130,952 B2 | 10/2006 | Nanki et al. | |
| 7,206,865 B2 * | 4/2007 | Creta et al. | 710/5 |
| 2002/0029307 A1 | 3/2002 | Singh et al. | |
| 2002/0103948 A1 | 8/2002 | Owen et al. | |
| 2003/0088799 A1 | 5/2003 | Bodas | |
| 2004/0199723 A1 | 10/2004 | Shelor | |
| 2005/0066114 A1 | 3/2005 | Barth et al. | |
| 2006/0053243 A1 | 3/2006 | David et al. | |
| 2006/0190677 A1 | 8/2006 | Janzen | |
| 2007/0011377 A1 * | 1/2007 | Gaskins | 710/107 |
| 2007/0028021 A1 * | 2/2007 | Gaskins | 710/107 |

FOREIGN PATENT DOCUMENTS

| | | |
|---|---|---|
| EP | 1416390 | 5/2004 |

* cited by examiner

PACKET AB SIGNAL DEFINITIONS

| ADDRESS SIGNAL | SIGNAL DEFINITION |
|---|---|
| ADDR[31:24] | ATTR[7:0]. ATTRIBUTE SIGNALS. |
| ADDR[23:16] | DID[7:0]. DEFERRED ID SIGNALS |
| ADDR[15:8] | BE[7:0]. BYTE ENABLE SIGNALS – INDICATES BYTES IN ASSOCIATED QUADWORD THAT ARE TO BE TRANSFERRED. |
| ADDR[7:3] | EXF[4:0]. EXTENDED FUNCTION SIGNALS. |

MICROPROCESSOR AND SIGNALS FOR SPARSE WRITE TRANSACTIONS

*PACKET REQB VALUE FOR SPARSE WRITE*  ⎯500

| REQ[4:0] VALUE | REQUEST TYPE |
|---|---|
| 00XXXb | SPARSE WRITE COMBINED MEMORY WRITE |

*FIG. 5*

*PACKET REQB VALUE FOR SPARSE WRITE*  ⎯600

| ADDRESS SIGNAL | SIGNAL DEFINITION |
|---|---|
| ADDR[31:24]:[15:8] | DE[15:0]. DOUBLEWORD ENABLE SIGNALS – INDICATES DOUBLEWORDS IN ASSOCIATED 64-BYTE WRITE THAT ARE TO BE TRANSFERRED. |
| ADDR[23:16] | DID[7:0]. DEFERRED ID SIGNALS |
| ADDR[7:3] | EXF[4:0]. EXTENDED FUNCTION SIGNALS. |

*FIG. 6*

APPARATUS AND METHOD FOR WRITING A SPARSELY POPULATED CACHE LINE TO MEMORY

CROSS-REFERENCE TO RELATED APPLICATIONS

This application claims the benefit of U.S. Provisional Application Ser. No. 60/700,691, filed on Jul. 19, 2005, which is herein incorporated by reference for all intents and purposes.

This application is related to the following co-pending U.S. Patent Applications, all of which have a common assignee and common inventors.

| Ser. No. | FILING DATE | TITLE |
| --- | --- | --- |
| 11363826 (CNTR.2269) | Feb. 28, 2006 | MICROPROCESSOR APPARATUS AND METHOD FOR ENABLING VARIABLE WIDTH DATA TRANSFERS |
| 11369896 (CNTR.2270) | Mar. 07, 2006 | APPARATUS AND METHOD FOR SELECTABLE QUAD-PUMPED/ DOUBLE-PUMPED ADDRESS BUS |
| 11374663 (CNTR.2271) | Mar. 13, 2006 | FLEXIBLE WIDTH DATA PROTOCOL |
| 11379166 (CNTR.2273) | Apr. 18, 2006 | APPARATUS AND METHOD FOR ORDERING TRANSACTION BEATS IN A DATA TRANSFER |

BACKGROUND OF THE INVENTION

1. Field of the Invention

The present invention relates to microprocessors, and more particularly to an apparatus and method for sparse line write transactions which solve the problem of slow writes to memory when sparse portions of contiguous write-combined memory space have been modified.

2. Description of the Related Art

Write combines and non-temporal store operations are not kept in the microprocessor but instead are written out to the memory bus. In a present day quad-pumped bus, such as is exhibited by most x86-compatible microprocessors, data transfers to memory are performed either on a cache line basis (i.e., eight quadwords for a 64-byte cache line) or on an individual quadword basis. When transferring an entire cache line, two clock cycles are required to transfer the eight associated quadwords and four quadwords are transferred during each cycle of the bus clock, thus accounting for the descriptor "quad-pumped." During this type of transfer, the entire 64-bytes are written to the bus; there is no mechanism to only write part of a cache line to memory. If only part of a cache line is to be written to memory, then a different type of data transfer must be employed, which allows for transfer of an individual quadword and, as part of the bus protocol, byte enable signals are set to indicate specific bytes within the transferred quadword that are to be written to the memory. Individual quadword transfers take one bus clock cycle. In this manner, the state of the art allows for either 64 contiguous bytes to be written to memory in two clock cycles or for a single quadword to be written in a single clock cycle.

In reviewing present day microprocessor bus architectures and associated protocols, in conjunction with observations concerning how contiguous memory spaces are manipulated by application programs, the present inventor has noted that the bus protocols associated with writes of data to the memory bus, as alluded to above, are disadvantageous when sparse data within a contiguous memory space has been modified and is to be written to the bus. For example, it is common to modify every other doubleword (four bytes) within a video buffer to change some display property. Conventional microprocessors, however, do not provide a mechanism for selecting data that is to be written to memory at any granularity other than byte granularity on a quadword-by-quadword basis. A sparse write of contiguous memory is thus set up to be written to the bus and such a write is limited to individual quadword transfers.

Because the data associated with combined writes (e.g., write combines, non-temporal stores) is typically large, it is disadvantageous to not fully utilize the bandwidth of a data bus, whether that bus is quad-pumped or otherwise. Since data buses typically operate at clock speeds many times slower than that of microprocessor core clocks, it is crucial to execute combined writes to memory with optimum efficiency. It is therefore desirable to be able to write an entire cache line to memory where individual doublewords within that cache line can be enabled.

A microprocessor according to an embodiment of the present invention includes processor logic and sparse write logic. The processor logic asserts address signals and request signals to provide an address and a request for a cache line memory write transaction. The sparse write logic causes the processor logic to specify a sparse write-combined memory write transaction on the request signals and to provide doubleword enable bits on the address signals. The processor logic asserts a first part on the address and request signals to provide the address and the request for the cache line memory write transaction, and asserts a second part on the address and request signals to specify the sparse write-combined memory write transaction and to provide the enable bits. The sparse write logic causes the processor logic to replace an attribute value and byte enable bits on the address signals of the second part with the doubleword enable bits.

The sparse write logic may cause the processor logic to provide a sparse write command value on the request signals and to provide the doubleword enable bits on the address signals during the second part. The sparse write-combined memory write transaction may be a quad-pumped cache line write transaction for writing eight quadwords. Each doubleword enable bit may identify a corresponding doubleword of the eight quadwords.

A processor bus system according to an embodiment of the present invention includes a processor bus coupled to a processor and a bus agent. The processor bus includes address signals, data signals, and request signals. The processor controls the address signals and the request signals to request a sparse write-combined memory write transaction and doubleword enable bits, and controls the data signals to provide data for the sparse write-combined memory write transaction. The bus agent writes portions of the data to a memory location selected by the enable bits. The processor asserts first part including an address and a memory line write request on the address signals and the request signals, respectively, and may assert a second part including a sparse write-combined memory write transaction request and the doubleword enable bits on the address signals and the request signals, respectively. The processor replaces an attribute value and byte enable bits on the address signals of the second part with the plurality of doubleword enable bits.

The sparse write-combined memory write transaction request may be a sparse write command value asserted on the request signals. The enable bits may be asserted on concatenated fields of the address signals. The sparse write-combined memory write transaction may be a quad-pumped cache line write transaction with eight quadwords. The bus agent may write selected doublewords of data to the memory location according to the doubleword enable bits.

A method of performing a sparse write-combined write transaction according to an embodiment of the present invention includes providing, by a processor, an address and a request for a memory write transaction, where the memory write transaction includes sending an entire cache line to memory, and where individual data elements within the cache line are enabled to be written to the memory with doubleword granularity; indicating, by the processor, that the memory write transaction is a sparse write-combined write transaction; and providing, by the processor, data for the sparse write-combined write transaction. The indicating includes asserting, by the processor, a first transaction part including an address and a request for the memory write transaction; replacing an attribute value and byte enable bits on address signals of a second transaction part with a plurality of doubleword enable bits; and asserting, by the processor, the second transaction part including a sparse line write command and the plurality of doubleword enable bits, wherein the plurality of doubleword enable bits determines which doublewords of the cache line are to be written to the memory.

The memory may include providing a cache line of eight quadwords. The method may further include receiving, by a bus agent, the address and the request for a memory write transaction, detecting that the memory write transaction is a sparse write-combined write transaction, receiving, by the bus agent, the doubleword enable bits, receiving, by the bus agent, the data, and writing portions of the data based on the doubleword enable bits to a memory location indicated by the address. The data may be eight quadwords of data.

BRIEF DESCRIPTION OF THE DRAWINGS

The benefits, features, and advantages of the present invention will become better understood with regard to the following description, and accompanying drawings where:

FIG. 5 is a diagram of a table illustrating an exemplary encoding of selected request signals of the REQ bus during part "B" of a request cycle according to an embodiment of the present invention; and FIG. 6 is a diagram of a table showing signal definitions for selected address signals of the ADDR bus during part "B" of a sparse write-combined request cycle when the signals of the REQ bus indicate a sparse write-combined write transaction.

DETAILED DESCRIPTION

The following description is presented to enable one of ordinary skill in the art to make and use the present invention as provided within the context of a particular application and its requirements. Various modifications to the preferred embodiment will, however, be apparent to one skilled in the art, and the general principles defined herein may be applied to other embodiments. Therefore, the present invention is not intended to be limited to the particular embodiments shown and described herein, but is to be accorded the widest scope consistent with the principles and novel features herein disclosed.

The inventor of the present application has recognized that it is disadvantageous to not fully utilize the bandwidth of a processor bus of a microprocessor. He has further noted that since processor buses typically operate at clock speeds many times slower than that of microprocessor core clocks, it is crucial to execute combined writes to memory with optimum efficiency. The inventor has recognized, in particular, that the conventional bus protocols associated with writes of data to the bus are disadvantageous when sparse data within a contiguous memory space has been modified and is to be written to the bus. He has therefore developed a sparse write-combined write attribute in which an entire 64-byte cache line is written to memory and where enable bits are indicated in a manner analogous to how byte enables are presently specified in an individual quadword (8-byte or 64-bit) writes, as will be further described below with respect to FIGS. 1-6.

Figure 1:
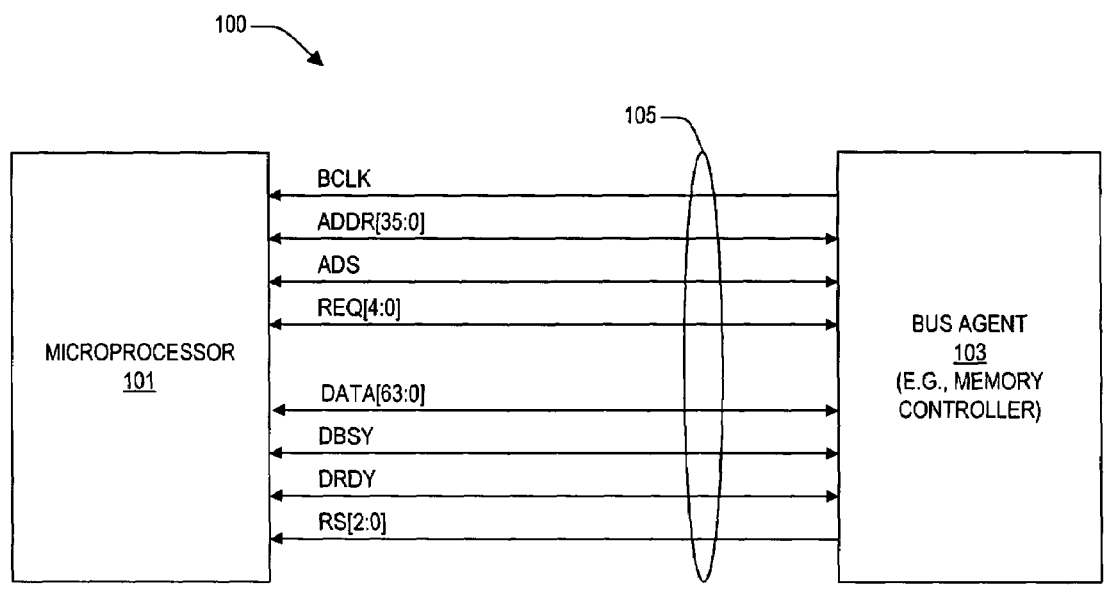
FIG. 1 is a simplified block diagram of a conventional microprocessor interface system.

FIG. 1 is a simplified block diagram of a conventional microprocessor interface system 100. The microprocessor interface system 100 includes a microprocessor 101 and a bus agent 103 interfaced with a memory bus 105. The bus agent 103 represents any number of different types of bus agents as known to those skilled in the art, such as a memory controller, a host/PCI (Peripheral Component Interconnect) bridge, etc. The processor bus 105 includes the signals for performing data transactions, including a bidirectional address bus ADDR, a bidirectional data bus DATA, and multiple control signals. In the illustrated embodiment, the ADDR bus has 36 signals shown as ADDR[35:0] and the DATA bus has 64 signals shown as DATA[63:0], although it is understood that the address and data buses may have any suitable number of signals depending upon the particular configuration and architecture. If transfers are of quadword granularity, for example, then one skilled will appreciate that only ADDR[35:3] are required. The control signals include a bus clock signal BCLK, a bidirectional address strobe signal ADS (indicating validity of the addresses on the ADDR bus), a bidirectional request bus REQ[4:0], which specifies the type of transaction requested (e.g., memory code read, memory data read, memory line write (eight quadwords), memory quadword write with byte enables), a bidirectional data bus busy signal DBSY (asserted by the entity that is providing data on the DATA bus), a data ready signal DRDY (asserted by either the device providing data during all clock cycles that data is transferred over the DATA bus), and a response bus RS which provides the type of transaction response (e.g., no data, normal data, implicit writeback) that is being completed over the DATA bus. In the illustrated embodiment, the RS bus has 3 signals shown as RS[2:0], and the REQ bus has 5 signals shown as REQ[4:0].

The signals of the memory bus 105 are provided in virtually all present day microprocessors with minor variation. Some processors multiplex addresses and data over the same signal group and thus provide control signals to indicate whether data or addresses are present. Other microprocessors utilize different address or data bus widths or control signals alternatively named. Regardless of the details of the particular processor configuration, virtually all processors provide signals for communication with bus agents to indicate what type of transaction is requested, the parameters of that transaction, and to transmit or receive the data.

Figure 2:
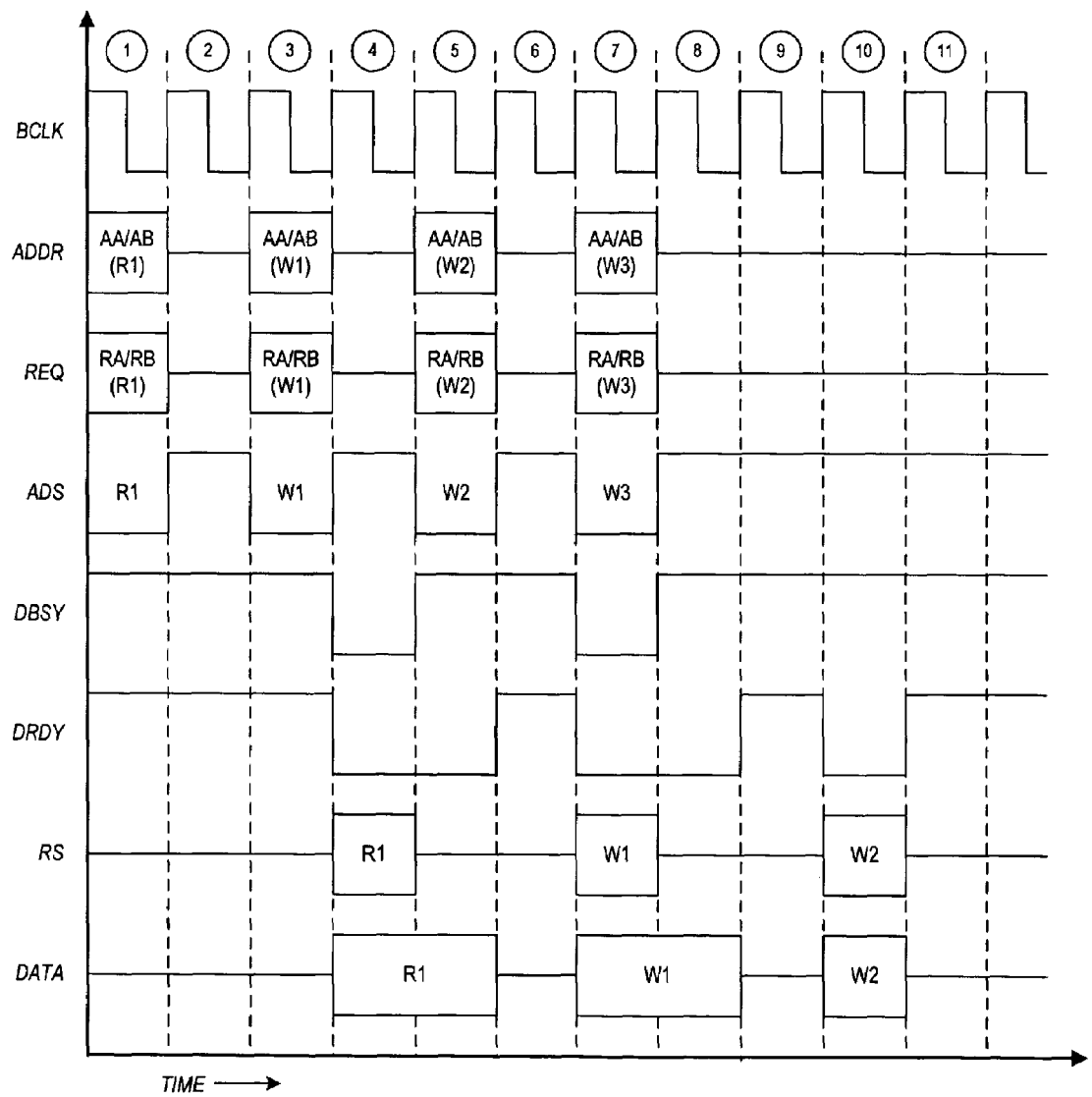
FIG. 2 is a timing diagram illustrating interaction of the signals described with reference to the conventional microprocessor interface system of FIG. 1 for performing a read transaction R1 followed by three write transactions W1, W2 and W3.

FIG. 2 is a timing diagram illustrating interaction of the signals described with reference to the conventional microprocessor interface system 100 for performing a read transaction R1 followed by three write transactions W1, W2 and W3. As shown, the BCLK, ADS, DBSY, and DRDY signals along with the ADDR, REQ, RS and DATA buses are plotted versus time. For each transaction, the microprocessor 101 provides the address on the ADDR bus and the bus agent 103 latches the address upon detection of the ADS signals. For clarity, the control signals are shown asserted as a logic low level although one skilled in the art appreciates that assertion can as well be indicated by a logic high level. Operation of such transactions and corresponding signals as named herein in an x86-compatible microprocessor are described in numerous references, including the book "Pentium Pro and Pentium II System Architecture $2^{nd}$ Edition," by Tom Shanley which is herein incorporated by reference for all intents and purposes.

Cycles of the BCLK clock signal are shown across the top of the timing diagram along with cycle numbers and the timing of transitions of the states of the signals are described with respect to the corresponding cycle number. During cycles 1, 3, 5, and 7, ADS is asserted along with addresses on the ADDR bus by the microprocessor 101 (i.e., transaction request "A" and "B" parts) to request a read transaction R1 followed by the three write transactions W1-W3. For simplicity of illustration, delays are ignored and it is understood that actual signal transitions occur during the cycle immediately following the illustrated signal transition. For example, the falling edge of the ADS signal to initiate the W1 write transaction shown occurring at the rising edge of the BCLK signal between clock cycles 2 and 3 actually occurs during clock cycle 3 after a relatively short delay. Numerous write transactions such as W1-W3 are typically executed for writes to memory of write-combined buffers and the like.

The parameters associated with each of these requests are provided in one clock cycle over the address bus ADDR and the request bus REQ. As shown, the "A" request part for each transaction is shown as "AA" for the ADDR bus and as "RA" for the REQ bus, and the "B" request part for each transaction is shown as "AB" for the ADDR bus and as RB for the REQ bus. Thus, for each read or write transaction, the ADDR bus shows "AA/AB" and the REQ bus shows "RA/RB". During the "A" part of the cycle, the ADDR bus contains the address of the transaction and the REQ bus contains the type of transaction requested (e.g., memory code read, memory data read, memory write). During the "B" part of the cycle, the request bus REQ, in the case of read and write transactions, provides the transaction length such as eight quadwords or a single quadword. If a single quadword is specified by REQ during the "B" part of the cycle, then the "B" part of the ADDR bus is interpreted according to table 300 shown in FIG. 3, in which the address signals ADDR[31:24] specify the attribute of the transfer (e.g., uncacheable, write-combined, write-through, etc.), and in which the address signals ADDR[15:8] specify byte enables that indicate specific bytes within the individual quadword which are to be written to memory.

Accordingly, during cycle 1, the ADDR and REQ buses specify a cache line read R1. The data associated with the read transaction R1 is transferred during cycles 4 and 5. During cycle 3, a cache line write transaction W1 is requested via the ADDR and REQ buses and the associated cache line is written out during cycles 7 and 8. During cycle 5, an individual quadword write transaction W2 is specified via the ADDR and REQ buses and the associated quadword is written during cycle 10. If the modified data associated with write transfer W2 is part of a sparse modified buffer, then during cycle 7, the ADDR and REQ buses contain the parameters to write the next quadword of that sparse modified buffer to memory.

Figures 3, 4:
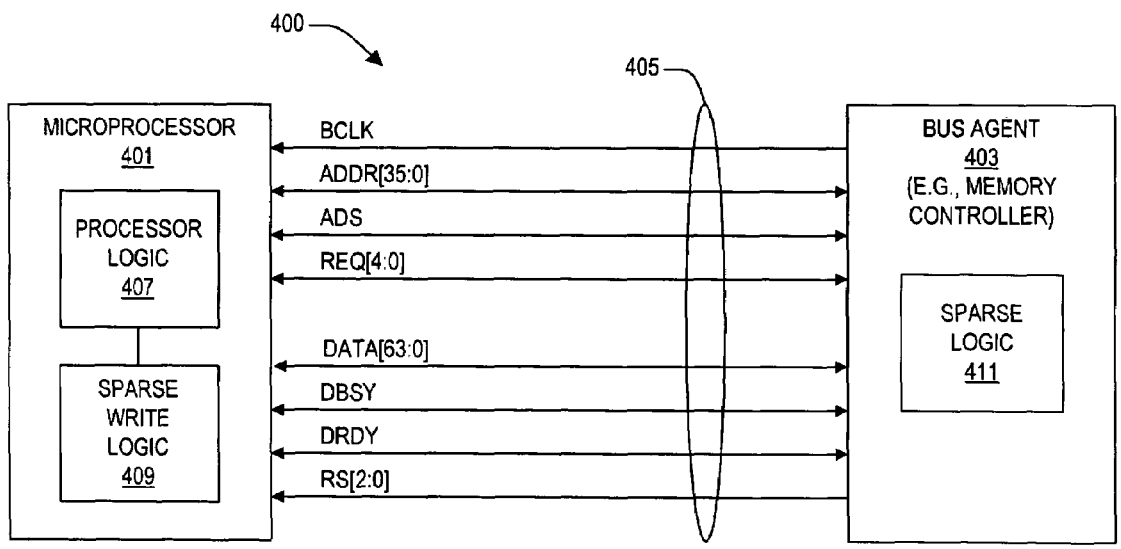
FIG. 3 is a diagram of a table illustrating signal definitions of address signals of the address (ADDR) bus if a single quadword is specified by the request (REQ) bus during the "B" request part of a write cycle.
FIG. 4 is a simplified block diagram of a microprocessor interface system implemented according to an embodiment of the present invention.

FIGS. 2 and 3 illustrate that it is inefficient to transfer sparsely modified areas of contiguous memory via individual quadword transfers. And as noted above, conventional microprocessors do not provide a mechanism for describing selected portions of data that is to be written to memory at any granularity other than byte granularity on a quadword-by-quadword basis. Because the data associated with write-combined memory buffers is typically large, it is disadvantageous to not fully utilize the bandwidth of a data bus. And since data buses typically operate at clock speeds many times slower than that of microprocessor core clocks, it is crucial to execute combined writes to memory with optimum efficiency. It is therefore desirable to be able to write an entire cache line to memory where individual doublewords within that cache line can be enabled.

A system and method according to embodiments of the present invention provides for a new type of attribute known as a sparse write-combined write transaction that is specified as an improvement to existing x86 bus protocol. In a sparse write-combined write transaction according to an embodiment of the present invention, an entire 64-byte cache line is written to memory and doubleword enable bits are indicated during part "B" of a request cycle in a manner analogous to how byte enables are presently specified in an individual quadword write.

FIG. 4 is a simplified block diagram of a microprocessor interface system 400 implemented according to an embodiment of the present invention. The microprocessor interface system 400 includes a microprocessor 401 and a bus agent 403 interfaced with a memory bus 405. The signals of the memory bus 405 are substantially similar as those of the microprocessor interface system 400 and operate in a substantially similar manner, with the exception that the values of the ADDR and REQ buses are modified during part "B" of the request cycle to provide for specification of a sparse write-combined write as further described below. The microprocessor 401 includes processor logic 407 and sparse write logic 409. The processor logic 407 is substantially similar to processor logic (not shown) within the microprocessor 101 for interfacing the ADDR, DATA and REQ buses and the other signals and for performing the microprocessor functions. The sparse write logic 409 is shown as a separate entity internally coupled to the processor logic 407. In an alternative embodiment, the sparse write logic 409 is incorporated within the processor logic 407. In one embodiment, the sparse write logic 409 is part of store logic (not shown). The sparse write logic 409 determines whether areas of memory that are scheduled for transfer to the memory bus 405 are sparse or otherwise. If these areas are sparse, then sparse write transactions are scheduled and executed to provide for efficient transfer of the data. The bus agent 403 includes sparse logic 411 which modifies the function of bus agent 403 to enable sparse write transactions to memory. In particular, the sparse logic 411 enables the bus agent 403 to detect, decode and perform sparse write transactions provided on the memory bus 405 by the microprocessor 401. The sparse logic 411 enables the bus agent 403 to write selected doublewords of the data of each sparse write transaction as determined by doubleword enable bits provided in the request portion of the sparse write transaction.

FIG. 5 is a diagram of a table 500 illustrating an exemplary encoding of the request signals REQ[4:0] during part "B" of a request cycle according to an embodiment of the present invention. Accordingly, encoding bits 4:3 to a binary value of 00b (in which an appended lowercase "b" denotes binary signals) indicates a sparse write-combined memory write transaction.

FIG. 6 is a diagram of a table 600 showing signal definitions for the address signals ADDR[35:0] during the "B" part of a sparse write-combined request cycle when the REQ[4:0] signals indicate a sparse write-combined write transaction as shown in table 500. Deferred ID and extended function signals are as provided for presently in an x86 processor. The ADDR[31:24] and ADDR[15:8] signals, however, no longer indicate attribute and byte enables, respectively. Instead, when the REQ bus indicates the sparse write-combined write transaction, these two fields are concatenated to form a doubleword enable field DE[15:0] whose individual bits indicate specific doublewords within an associated cache line that are to be written to memory. For the sparse write command, the attribute value and the byte enable bits of the ADDR bus are replaced by doubleword enable bits. Each doubleword enable bit corresponds to a doubleword in the eight quadwords of the write transaction. In one embodiment, for example, each doubleword enable bit of the DE field is asserted to a logic "1" to specify that the corresponding doubleword in the eight quadwords of data of the sparse write-combined write transaction is to be written to a corresponding doubleword in memory, whereas a logic "0" indicates that the corresponding doubleword on the memory bus 405 is to be ignored so that the corresponding doubleword in memory remains unchanged. In this manner, it is possible to modify any selected combination of doublewords in a single sparse write-combined write transaction, such as every other doubleword in a 64 byte section of a video buffer.

Although the present invention has been described in considerable detail with reference to certain preferred versions thereof, other versions and variations are possible and contemplated. For example, the particular sizes of the address, data and/or request buses may be modified. The enable bits may correspond to data sizes other than doublewords. Inverse logic may be employed. Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

The invention claimed is:

1. A microprocessor, comprising:
processor logic which asserts address signals and request signals to provide an address and a request for a cache line memory write transaction, wherein said cache line memory write transaction comprises sending an entire cache line to memory, and wherein individual data elements within said cache line are enabled to be written to said memory with doubleword granularity; and
sparse write logic, coupled to said processor logic, which causes said processor logic to specify a sparse write-combined memory write transaction on said request signals and to provide a corresponding plurality of doubleword enable bits on said address signals, wherein said corresponding plurality of doubleword enable bits determines which doublewords of said cache line are to be written to said memory;
wherein said processor logic asserts a first part on said address signals and said request signals to provide said address and said request for said cache line memory write transaction, and which asserts a second part on said address signals and said request signals to specify said sparse write-combined memory write transaction and to provide said plurality of doubleword enable bits; and
wherein said sparse write logic causes said processor logic to replace an attribute value and byte enable bits on said address signals of said second part with said plurality of doubleword enable bits.

2. The microprocessor of claim 1, wherein said sparse write logic causes said processor logic to provide a sparse write command value on said request signals during said second part.

3. The microprocessor of claim 1, wherein said sparse write logic causes said processor logic to provide said plurality of doubleword enable bits on said address signals during said second part.

4. The microprocessor of claim 1, wherein said sparse write-combined memory write transaction comprises a quad-pumped cache line write transaction for writing eight quadwords.

5. The microprocessor of claim 4, wherein each of said plurality of doubleword enable bits identifies a corresponding doubleword of said eight quadwords.

6. A processor bus system, comprising:
a processor bus comprising address signals, data signals, and request signals;
a processor, coupled to said processor bus, which controls said address signals and said request signals to request a sparse write-combined memory write transaction and to provide a plurality of doubleword enable bits, and which controls said data signals to provide data for said sparse write-combined memory write transaction, wherein said sparse memory write transaction comprises sending an entire cache line to memory, and wherein individual data elements within said cache line are enabled to be written to said memory with doubleword granularity; and
a bus agent, coupled to said processor bus, which writes portions of said data to a memory location selected by said plurality of doubleword enable bits, wherein said corresponding plurality of enable bits determines which doublewords of said cache line are to be written to said memory;
wherein said processor asserts a first part comprising an address and a memory line write request on said address signals and said request signals, respectively, and asserts a second part comprising a sparse write-combined memory write transaction request and said plurality of doubleword enable bits on said address signals and said request signals, respectively; and
wherein said processor replaces an attribute value and byte enable bits on said address signals of said second part with said plurality of doubleword enable bits.

7. The processor bus system of claim 6, wherein said sparse write-combined memory write transaction request comprises a sparse write command value asserted on said request signals.

8. The processor bus system of claim 6, wherein said plurality of doubleword enable bits are asserted in concatenated fields of said address signals.

9. The processor bus system of claim 6, wherein said sparse write-combined memory write transaction comprises a quad-pumped cache line write transaction with eight quadwords.

10. The processor bus system of claim 9, wherein said bus agent writes selected doublewords of said data to said memory location according to said plurality doubleword enable bits.

11. A method of performing a sparse write-combined write transaction, comprising:

providing, by a processor, an address and a request for a memory write transaction, wherein the memory write transaction comprises sending an entire cache line to memory, and wherein individual data elements within the cache line are enabled to be written to the memory with doubleword granularity;

indicating, by the processor, that the memory write transaction is a sparse write-combined write transaction, said indicating comprising:

asserting, by the processor, a first transaction part including an address and a request for the memory write transaction replacing an attribute value and byte enable bits on address signals of a second transaction part with a plurality of doubleword enable bits; and asserting, by the processor, the second transaction part including a sparse line write command and the plurality of doubleword enable bits, wherein the plurality of doubleword enable bits determines which doublewords of the cache line are to be written to the memory; and providing, by the processor, data for the sparse write-combined write transaction.

12. The method of claim 11, wherein said providing data for the sparse write-combined write transaction comprises providing a cache line of eight quadwords.

13. The method of claim 11, further comprising:

receiving, by a bus agent, the address and the request for a memory write transaction and detecting that the memory write transaction is a sparse write-combined write transaction;

receiving, by the bus agent, the plurality of doubleword enable bits;

receiving, by the bus agent, the data; and writing portions of the data based on the plurality of doubleword enable bits to a memory location indicated by the address.

* * * * *